(12) United States Patent
Diab

(10) Patent No.: US 8,479,043 B2
(45) Date of Patent: Jul. 2, 2013

(54) POWER OVER ETHERNET POWERED DEVICE WITH POWER FALLBACK STATES

(75) Inventor: Wael William Diab, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 348 days.

(21) Appl. No.: 12/035,686

(22) Filed: Feb. 22, 2008

(65) Prior Publication Data

US 2009/0217088 A1 Aug. 27, 2009

(51) Int. Cl.
*G06F 11/00* (2006.01)
(52) U.S. Cl.
USPC ............................................. 714/14
(58) Field of Classification Search
USPC ............................................. 714/14
See application file for complete search history.

(56) References Cited

U.S. PATENT DOCUMENTS

| 7,472,290 | B2 | 12/2008 | Diab et al. | |
|---|---|---|---|---|
| 7,478,251 | B1 | 1/2009 | Diab et al. | |
| 2006/0143583 | A1* | 6/2006 | Diab et al. | 716/4 |
| 2006/0179147 | A1* | 8/2006 | Tran et al. | 709/227 |
| 2007/0030613 | A1* | 2/2007 | Sousa et al. | 361/92 |
| 2007/0081553 | A1* | 4/2007 | Cicchetti et al. | 370/466 |
| 2008/0052546 | A1* | 2/2008 | Schindler et al. | 713/300 |

* cited by examiner

*Primary Examiner* — Scott Baderman
*Assistant Examiner* — Jigar Patel
(74) *Attorney, Agent, or Firm* — Duane S. Kobayashi

(57) ABSTRACT

A power over Ethernet (PoE) powered device with power fallback states. A powered device can be powered using a primary local power source and a secondary PoE power source. To enable consistent behavior by the powered device, a controlled power fallback state can be defined that would ensure limited functionality in the powered device upon a failure of the primary local power source. For example, the limited functionality could include a communication channel to the switch, diagnostic circuitry, etc.

20 Claims, 4 Drawing Sheets

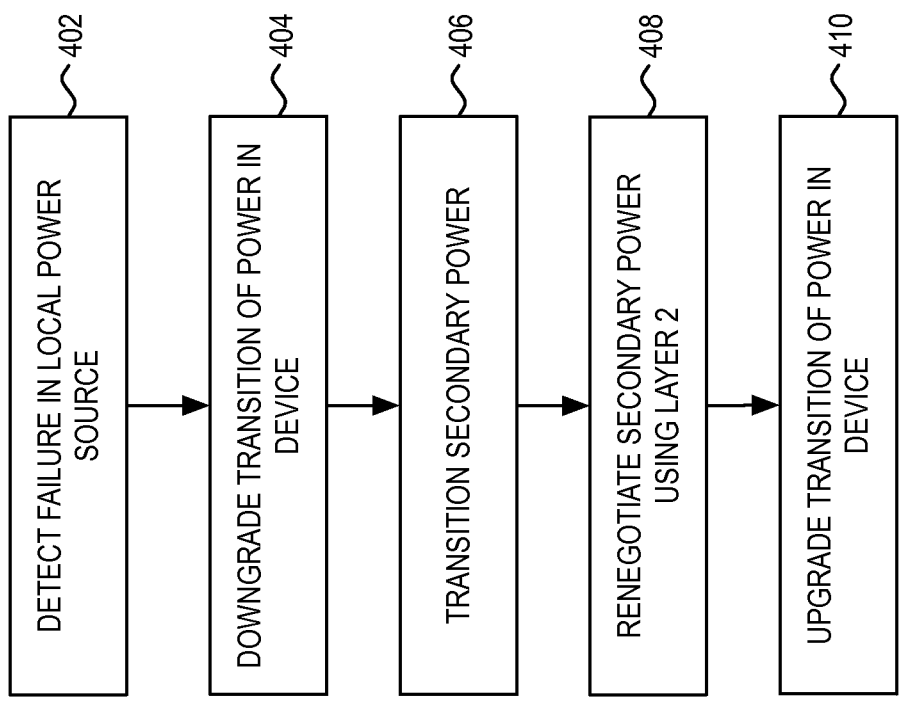

POWER OVER ETHERNET POWERED DEVICE WITH POWER FALLBACK STATES

BACKGROUND

1. Field of the Invention

The present invention relates generally to power over Ethernet (PoE) and, more particularly, to a PoE powered device with power fallback states.

2. Introduction

In a PoE application such as that described in the IEEE 802.3af and 802.3at specifications, a power sourcing equipment (PSE) can deliver power to a powered device (PD) over Ethernet cabling. Various types of PDs exist, including voice over IP (VoIP) phones, wireless LAN access points, Bluetooth access points, network cameras, computing devices, etc.

In accordance with IEEE 802.3af, a PSE can deliver up to 15.4 W of power to a single PD over two wire pairs. In accordance with IEEE 802.at, on the other hand, a PSE may be able to deliver up to 30 W of power to a single PD over two wire pairs. Other proprietary solutions can potentially deliver higher or different levels of power to a PD. A PSE may also be configured to deliver power to a PD using four wire pairs.

In one application, PoE can be used to provide power backup for a device. In other words, the device can be designed to receive power primarily from a local power source such as a power-supply brick plugged into a wall outlet or power strip. Only in the event of a failure in the local power source would the device need to be supplied with power from the backup PoE power source.

In this power backup application, it is important that the transition between the primary local power source and the backup PoE power source occurs seamlessly. As would be appreciated, a seamless transition between the primary local power source and the backup PoE power sources would ensure that the device operates predictably during the transition. What is needed therefore is a mechanism that enables a PD to manage effectively the loss of a local power supply.

SUMMARY

A power over Ethernet powered device with power fallback states, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which:

FIG. 4 illustrates a flowchart of a process of the present invention.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
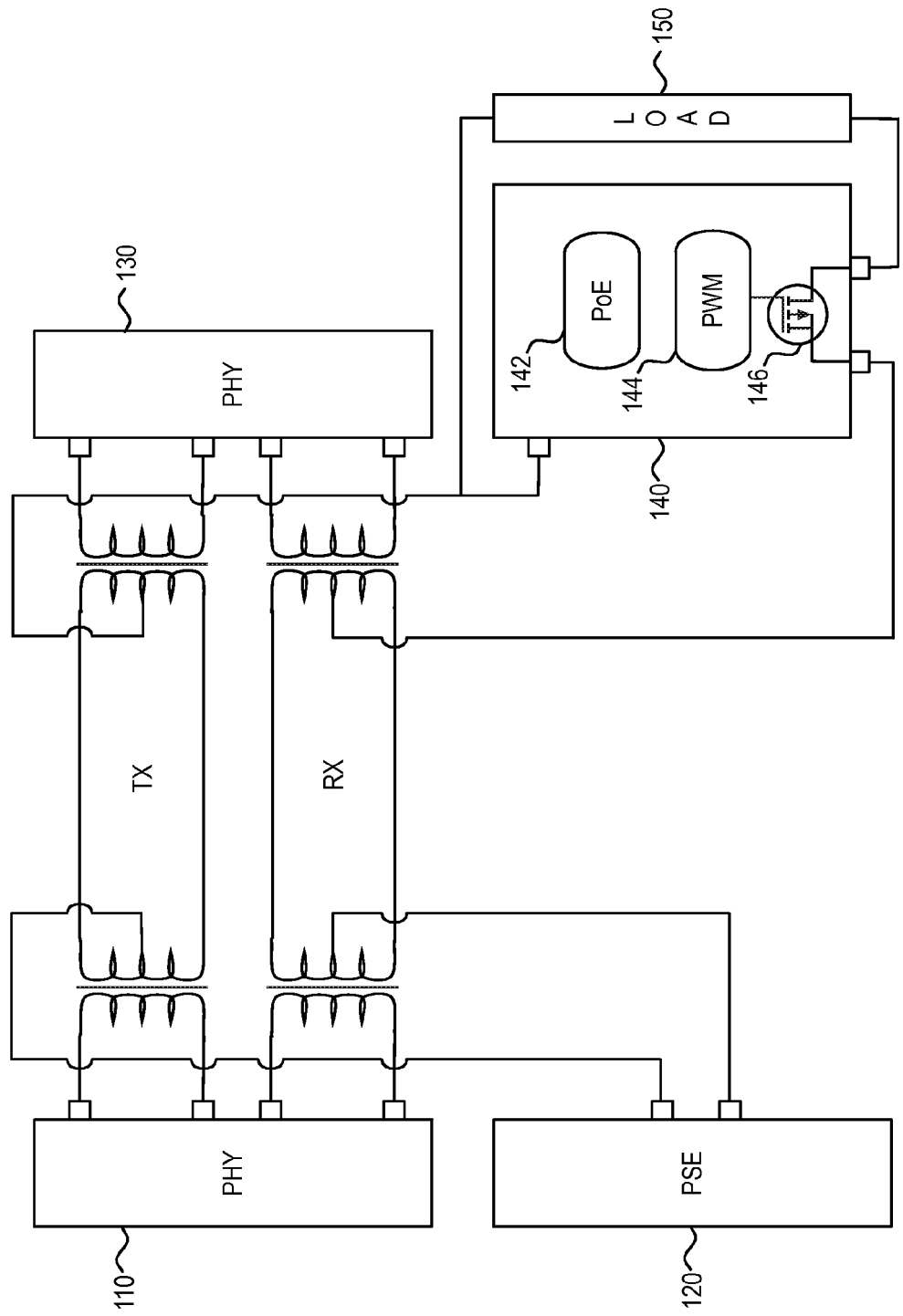
FIG. 1 illustrates an embodiment of a PoE system.

FIG. 1 illustrates an embodiment of a PoE system. As illustrated, the PoE system includes PSE 120 that transmits power to PD 140. Power delivered by PSE 120 to PD 140 is provided through the application of a voltage across the center taps of transformers that are coupled to a transmit (TX) pair and a receive (RX) pair of wires carried within an Ethernet cable. In general, the TX/RX pair can be found in, but not limited to structured cabling. The two TX and RX pairs enable data communication between Ethernet PHYs 110 and 130 in accordance with 10BASE-T, 100BASE-TX, 1000BASE-T, 10GBASE-T and/or any other layer 2 PHY technology. Here, it should be noted that PoE does not require the presence of a PHY.

As is further illustrated in FIG. 1, PD 140 includes PoE module 142. PoE module 142 includes the electronics that would enable PD 140 to communicate with PSE 120 in accordance with a PoE standard such as IEEE 802.3af, 802.3at, legacy PoE transmission, or any other type of PoE transmission. PD 140 also includes pulse width modulation (PWM) DC:DC controller 144 that controls power FET 146, which in turn provides constant power to load 150.

In the example of the IEEE 802.3af standard, PSE 120 can deliver up to 15.4 W of power to a plurality of PDs (only one PD is shown in FIG. 1 for simplicity). In the IEEE 802.at specification, on the other hand, a PSE may be able to deliver up to 30 W of power to a PD over two wire pairs. A PSE may also be configured to deliver power to a PD using four wire pairs. Other proprietary solutions can potentially deliver higher or different levels of power to a PD. In general, high power solutions are often limited by the limitations of the cabling.

Figure 2:
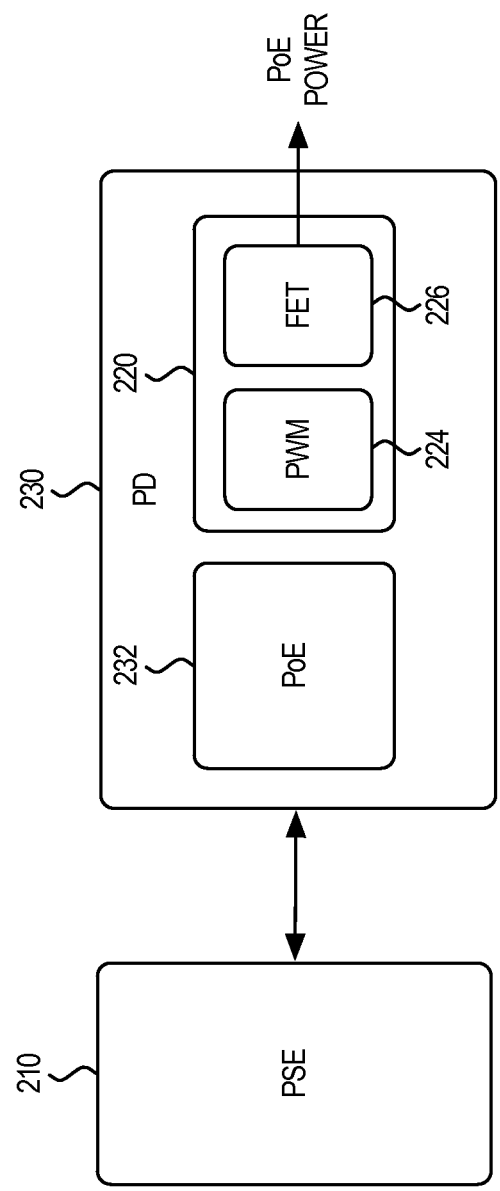
FIG. 2 illustrates a simplified view of a PoE system.

FIG. 2 illustrates a simplified view of a PoE system. In this illustration, PSE 210 is shown delivering power to PD 230. As further illustrated in FIG. 2, PD 230 includes PoE module 232. This module includes the electronics that would enable PD 230 to communicate with PSE 210 in accordance with a PoE specification such as IEEE 802.3af, 802.3at, etc. PD 230 also includes power module 220, which further includes a PWM controller 224 and power FET 226. As noted, power FET 226 is designed to produce output PoE power based on the power provided by PSE 210 over network cabling. In various embodiments, PWM controller 224 and power FET 226 can be incorporated in a single die, or can be on separate dies as part of a multi-chip module.

A conventional application of PoE is as a primary power source for a PD. In this application, the PSE would have the sole responsibility for providing power to one or more PDs. Any failure in the PoE system or oversubscription in the available PSE power would lead to a shut down or diminished operation of the PD. For this reason, much effort has been expended in identifying various mechanisms that would ensure that the PSE provides a consistent source of power to as many PDs as possible. In another application, PoE could be used either at a subset of its power delivery or even at full delivery but for a secondary function, such as powering additional functions and/or charging a battery, etc.

In yet another application, the PoE system can be designed to operate as a backup source of power instead of as a primary source of power. In this application, the PD would be powered primarily from a local power source, and not from the PSE. In one example, the PD could receive power from the PSE only upon some failure in the local power source. As would be appreciated, the PSE can be designed to operate as both a primary source of power and a backup source of power to selected PDs that are connected to the PSE.

One of the issues in using a PSE as a backup source of power is the management of the transition between power sources. As would be appreciated, a failure in the local source of power would often result in a serious disruption in the operation of the PD. This disruption in operation can lead to inconsistent and/or undefined PD behavior in the process of responding to the failure in the local power source. Here, the potential for the device shutting down, rebooting and/or misbehaving or operating unreliably makes any attempt to using PoE as a backup power source unrealistic. It is therefore a feature of the present invention that consistent behavior in the PD upon a failure in the local power source can be aided by the definition of one or more controlled fallback states for the PD. In one example, a fallback state would aid in the switching over from a primary source, wherein a shutdown of non-essential functions would happen so that the reaction time and total power draw of the essentials is within the requirement of the PoE power source.

In one embodiment, the controlled fallback state(s) are bounded power state(s) that would last for a certain amount of time (e.g., hundreds of milliseconds) until a secondary source of power can be activated or otherwise transitioned. For example, the controlled and bounded fallback state(s) can be used to ensure that the communication channels to the switch and basic diagnostic circuitry that is in the PD could be kept operational for a specific amount of time. Operation of the PD in the fallback state(s) during this time could then be used to configure the receipt of secondary power from the PSE. As this example illustrates, the definition of controlled fallback state(s) can ensure consistent behavior by the PD in responding to a failure of the local power source. In other words, during the transition to the PoE power source as the primary, the behavior is defined, bounded in both power/time, and predictable.

In various implementations, the operation of the device when using secondary power may be (1) the same as normal where the PoE and non-PoE power source are capable of delivering the same power, (2) a subset of the functionality if the PoE source can only provide a lower amount of power, or (3) a subset of the functionality during the hardware initiation state of the PoE (including hardware classification) that may transition into a different subset of functionality or full functionality when a further classification process (e.g., Layer 2 engine) of the PoE system completes.

Figure 3:
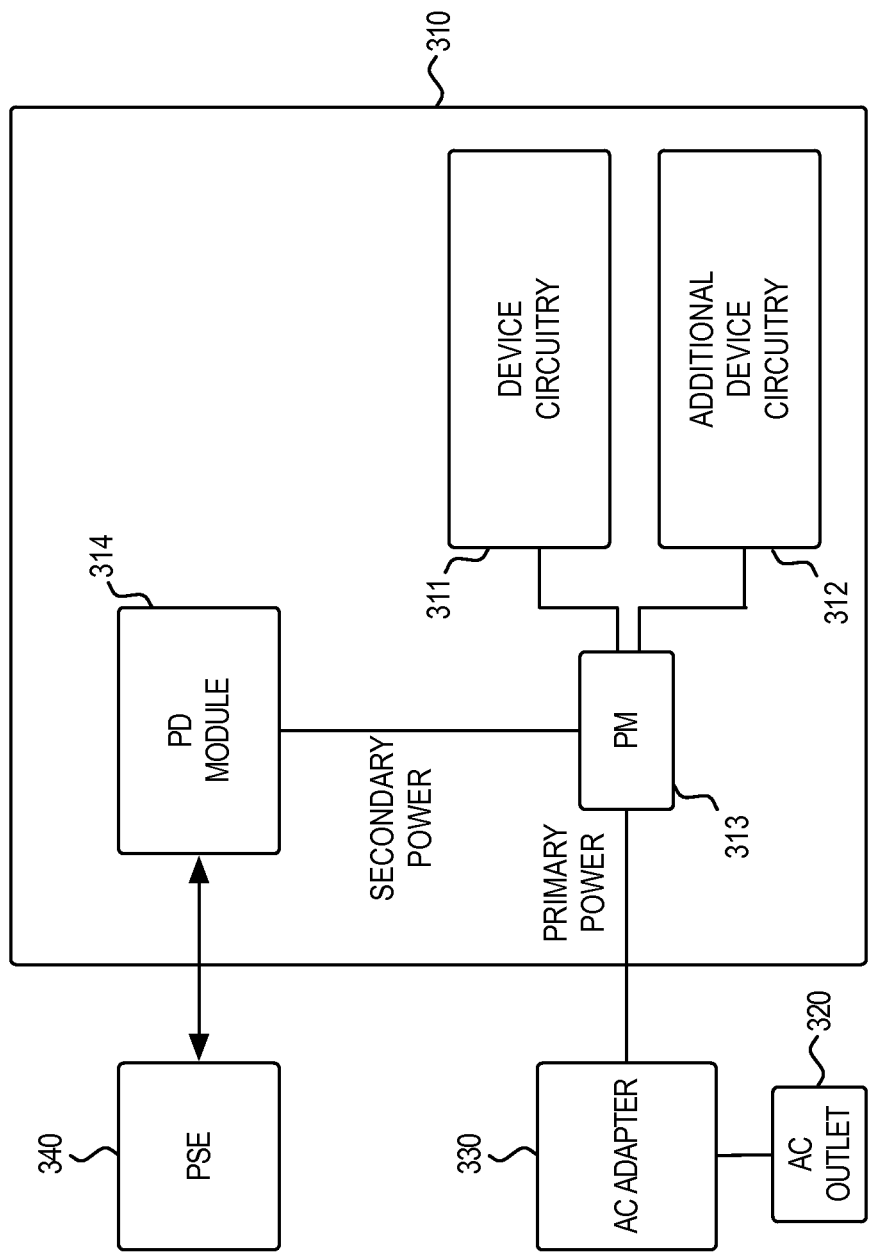
FIG. 3 illustrates an embodiment of a PoE system that is used for backup power.

To illustrate the principles of the present invention, reference is now made to the embodiment of FIG. 3, which shows the use of a PoE system as a secondary source of power. As illustrated, device 310 uses AC outlet 320 and AC adapter 330 as its primary source of power. The primary power received from this local power source is fed to power management (PM) 313, which feeds the needed power to device circuitry 311 and additional device circuitry 312. Here, device circuitry 311 represents those components that enable device 310 to perform its primary function (e.g., VOIP phone, wireless LAN access point, laptop, etc.), while additional device circuitry 312 represents those components that enable device 310 to perform secondary functions. The feeding by PM 313 of power from AC adapter 330 to device circuitry 311 and possibly secondary device circuitry 312 can represent the normal operating state of PD 310.

As illustrated, PM 313 is also designed to receive secondary power from PD module 314. It should be noted that PM 313 may be configured to operate as a switch if the PoE subsystem is operating as a backup power source. PM 313 may also be designed to manage a power pool that includes power from local and PoE power sources. Here, if one of the power sources falters, then the remaining power source can become the primary or even sole power supply.

In one embodiment, PD module 314 would include the electronics that would enable PoE communication with PSE 340 as well as a power module for generating secondary power. During the normal operating state of device 310 where PoE is used as a backup power source, PD module 314 can be maintained in any one of a variety of operating states. For example, PD module 314 can be designed to be maintained in any one of a pre-detection state, post-detection state, pre-classification state, post-classification state, or pre-power application state. This can be the case because PD module 314 may not be used to actively power device 310 while power device 310 is in its normal operating state, but may be maintained in a state that can ultimately lead to a transition to a state of power application. As would be appreciated, the state in which PD module 314 is maintained would be implementation dependent. Here, the choice of state would be influenced by such factors as the source (e.g., remote PSE or local) and amount of power needed to maintain such state, the power request/priority or reservation protocol implemented by the PSE and PD module, the time to transition to the active use of secondary power from the PSE, etc.

It should be noted that PD module 314 can also be maintained in a powering state if it is part of the power pool that is managed by PM 313. In this scenario, the primary and secondary sources of power can be used to selectively power multiple pieces of functionality that exist in the device. In one example, this allocation can be based on the relative priority of the functionality. When either of the power sources falters in some way, a fallback state can be entered where certain functions are dropped or otherwise limited to thereby enable the resulting functionality to fit within the remaining power budget (or budget-ready sources).

Regardless of the state in which PD module 314 is maintained, it is critical that a failure in the local power source will produce consistent results by PD module 314 in activating or otherwise transitioning the secondary power. In accordance with the present invention, these consistent results are produced through the definition of controlled fallback state(s) in device 310. Here, a controlled fallback state represents a state in which at least the components in device 310 that are needed to activate or otherwise transition the secondary power are maintained in an active state for a limited duration of time. During this limited duration of time, all or part of circuitry in device 310 would be disabled due to the loss of the primary power source.

In one embodiment, the components in device 310 that are needed to activate or otherwise transition the secondary power would include PD module 314. This is the case since PD module 314 would be involved in coordinating the provision of power by PSE 340 to device 310. In one scenario, the coordination of the provision of power can be done without regard to the needs of circuitry in device 310. This can be the case, for example, where the needs of circuitry in device 310 are relatively static, or only an initial predefined power level is requested. In another scenario, the coordination of the provision of power can be done in consideration of the needs of circuitry in device 310. This can be the case, for example, where recent or anticipated power levels are considered. In one embodiment, the controlled fallback state can also maintain those components that would enable device 310 to save certain information (e.g., current power level, future power levels, failure logs, state information, etc.) to memory upon failure of the primary power source. This saved information can then be accessed by PD module 314 and communicated to the switch during the controlled fallback state. Where the information is power related, it can be used in the request/reservation protocol between PSE 340 and PD module 314.

As has been described, the controlled fallback state(s) represent a state of reduced functionality for device 310. In many instances, the reduced functionality would represent a state where some circuitry in device 310 is inactive due to the loss of the primary power source. In a typical scenario, the controlled fallback state(s) also have limited durations that are relatively short. For example, the controlled fallback state(s) can have a duration that is long enough simply to transition device 310 into a state where PSE power has been turned on. In one scenario, this duration can last for less than one second, depending upon the implementation.

To support controlled fallback state(s) that have reduced device functionality and limited duration, a source of power is needed to maintain the reduced device functionality. In one embodiment, an amount of power can be provided by PoE at a level that would be sufficient to power the controlled fallback state(s). In another embodiment, the fallback state(s) power can represent any power source (e.g., capacitance, battery, etc.) within device 310 that can support the limited duration of reduced functionality.

To further illustrate the principles of the present invention, reference is now made to the flowchart of FIG. 4. As illustrated, the process begins at step 402, where a failure in the local power source is detected. In one embodiment, this detection can be facilitated through a power good signal that is reflective of the active powering by the local power source such as an AC adapter. As would be appreciated, the controller that receives the power good signal would be implementation dependent. For example, in one embodiment, the power good signal can be received by a controller module (e.g., PoE module) in the device that will remain active upon the failure in the local power source. A change in the status of the received power good signal would then serve to initiate a response to the failure in the local power source.

Upon a failure in the local power source, the process would then continue to step 404 where a downgrade transition of power in the device would commence. In one example, the downgrade transition of power would include the deactivation of additional device circuitry 312. In another example, the downgrade transition of power would include the deactivation of device circuitry 311 and additional device circuitry 312. Here, as part of entering into the fallback state, the device would enter into a state of reduced functionality, wherein at least those components in the device that are needed for post-failure processing are maintained in an active state. Unneeded components would be shut down due to the loss of power. In one embodiment, the downgrade transition of step 404 would maintain PD module 314 in an active state.

Next, at step 406, a transition in secondary power would occur. In one embodiment, this step would include PD module activating the backup PoE power. In another embodiment, this step would include PD module increasing the amount of power that is provide by the PSE. In addition to the transition of secondary power, the PD module can also be designed to generate messages (e.g., SOS) or signatures that would provide information related to the failure or the subsequent recovery. As would be appreciated, these communications can be performed using packets (e.g., LLDP, LLDP-MED, IP, or any other network packet), or other physical signaling technique. In another embodiment, the post-failure processing would include the recording of state information, diagnostic log, or other needed information to memory.

In a scenario where the PD module activates the secondary power at step 406, the PD module can also renegotiate the secondary power using a Layer 2 engine. In this process, the initial power level classification can be renegotiated to account for a particular power need of the device. After the negotiated power level commences via PoE, the process then continues to step 410 where an upgrade transition of the power in the device would commence. In one example, the upgrade transition of power would include the activation of additional device circuitry 312. In another example, the upgrade transition of power would include the activation of device circuitry 311 and additional device circuitry 312.

In general, fallback state(s) can be defined to maintain needed components in an active state for a limited duration. The power requirements to support the fallback state are therefore lessened, which eases the cost of implementation.

In one embodiment, multiple fallback states can be implemented into the device depending on the amount of functionality and number of power sources available. Combinations can also apply. For example, if a local battery is available, limited user functions can be sustained in addition to maintaining the link and communication with a PSE. If the battery has also failed, then the basic limited function can be sustained through local charge on the device enough for a communication to the PSE. In another embodiment, the primary power source can be represented by a DC feed or another PoE port on the PD device.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A method, comprising:

receiving, by a powered device that is coupled to a power sourcing equipment via a network cable, power from a primary power source that enables said powered device to function at a first level of functionality in an active state during a first time period, said primary power source being coupled to said powered device via a second cable;

detecting, by said powered device, a failure to receive power from said primary power source via said second cable;

upon detection of said failure, transitioning said powered device into a fallback power state, wherein said powered device has a second level of functionality in said fallback power state that is lower than said first level of functionality in said active state, said second level of functionality in said fallback power state being supported by a temporary internal power source within said powered device; and after detection of said failure to receive power from said primary power source via said second cable and prior to receiving power from power sourcing equipment via said network cable, transmitting a configuration message from said powered device to said power sourcing equipment via said network cable during said fallback power state, said transmitted message enabling an activation of a delivery of power from said power sourcing equipment to said powered device via said network cable during a second time period following said first time period.

2. The method of claim 1, wherein said fallback power state facilitates an operation of a power over Ethernet controller in said powered device.

3. The method of claim 1, wherein said transmitting comprises transmitting using Layer 2 communication.

4. The method of claim 1, wherein said transmitting comprises transmitting using Layer 1 communication.

5. The method of claim 1, further comprising transitioning said powered device to a second fallback power state after said message is transmitted, wherein said second fallback power state supports less functionality than the previous fallback power state.

6. The method of claim 1, further comprising writing information to a memory during said fallback power state.

7. The method of claim 6, wherein said writing comprises writing failure information or state information.

8. The method of claim 1, wherein said temporary internal power source supports the functioning of said powered device in said fallback power state for a period of less than one second.

9. The method of claim 1, wherein said configuration message includes power request negotiation information.

10. A method, comprising:
   transitioning a powered device from an active state having a first level of functionality to a fallback power state upon a detection of a failure to receive power from a primary power source, said fallback power state having a second level of functionality that is lower than said first level of functionality in said active state, said powered device being coupled to a power sourcing equipment via a network cable and coupled to said primary power source via a second cable, wherein said second level of functionality is supported by a temporary internal power source within said power device; and
   after detection of said failure to receiver power from said primary power source via said second cable and prior to receiving power from said power sourcing equipment via said network cable, transmitting a configuration message from said powered device to said power sourcing equipment via said network cable during said fallback power state, said transmitted message enabling an activation of a delivery of power from said power sourcing equipment to said powered device via said network cable after said failure.

11. The method of claim 10, wherein said fallback power state facilitates an operation of a power over Ethernet controller in said powered device.

12. The method of claim 11, wherein said transmitting comprises transmitting using Layer 2 communication.

13. The method of claim 11, wherein said transmitting comprises transmitting using Layer 1 communication.

14. The method of claim 10, further comprising transitioning said powered device to a second fallback power state after said message is transmitted, wherein said second fallback power state supports less functionality than the previous fallback power state.

15. The method of claim 10, further comprising writing information to a memory during said fallback power state.

16. The method of claim 15, wherein said writing comprises writing failure information or state information.

17. The method of claim 10, wherein said temporary internal power source supports the functioning of said powered device in said fallback power state for a period of less than one second.

18. The method of claim 10, wherein said configuration message includes power request negotiation information.

19. A powered device, comprising:
   a power port that is configured for coupling to a primary power source via a power cable, wherein power from said primary power source enables said powered device to function at a first level of functionality in an active state;
   a network port that is configured for coupling to a power sourcing equipment via a network cable;
   a temporary power source; and
   a controller that is configured to transition said powered device from said active state to a fallback power state upon a detection of a failure to receiver power from said primary power source via said power cable, wherein said powered device has a second level of functionality in said fallback power state that is lower than said first level of functionality in said active state, said second level of functionality in said fallback power state being supported by said temporary internal power source within said powered device, said controller being further configured, after detection of said failure to receiver power from said primary power source via said power cable and prior to receiving power from said power sourcing equipment via said network cable, to transmit a configuration message from said powered device to said power sourcing equipment via said network cable during said fallback power state, said transmitted message enabling an activation of a delivery of power from said power sourcing equipment to said powered device via said network cable.

20. The powered device of claim 19, wherein said temporary power source supports the functioning of said powered device in said fallback power state for a period of less than one second.

* * * * *

UNITED STATES PATENT AND TRADEMARK OFFICE
CERTIFICATE OF CORRECTION

PATENT NO. : 8,479,043 B2
APPLICATION NO. : 12/035686
DATED : July 2, 2013
INVENTOR(S) : Wael William Diab Page 1 of 1

It is certified that error appears in the above-identified patent and that said Letters Patent is hereby corrected as shown below:

In the Claims

Col. 7, line 40, replace "power" with --powered--.

Signed and Sealed this
Twenty-seventh Day of August, 2013

Teresa Stanek Rea
*Acting Director of the United States Patent and Trademark Office*